United States Patent
Suzuki et al.

(10) Patent No.: US 11,673,455 B2
(45) Date of Patent: Jun. 13, 2023

(54) AUTOMOBILE DOOR

(71) Applicant: NIPPON STEEL CORPORATION, Tokyo (JP)

(72) Inventors: Toshiya Suzuki, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 142 days.

(21) Appl. No.: 17/422,392

(22) PCT Filed: Jan. 15, 2020

(86) PCT No.: PCT/JP2020/001057
§ 371 (c)(1),
(2) Date: Jul. 12, 2021

(87) PCT Pub. No.: WO2020/149296
PCT Pub. Date: Jul. 23, 2020

(65) Prior Publication Data
US 2022/0126656 A1    Apr. 28, 2022

(30) Foreign Application Priority Data
Jan. 15, 2019  (JP) .............................. JP2019-004037

(51) Int. Cl.
*B60J 5/04*     (2006.01)
*B60R 21/00*    (2006.01)
*B60R 21/04*    (2006.01)

(52) U.S. Cl.
CPC ........... *B60J 5/0441* (2013.01); *B60J 5/0444* (2013.01); *B60R 2021/0006* (2013.01); *B60R 2021/0414* (2013.01)

(58) Field of Classification Search
CPC ...... B60J 5/0441; B60J 5/0444; B60J 5/0447; B60J 5/0437; B60R 2021/006; B60R 2021/0414
(Continued)

(56) References Cited

U.S. PATENT DOCUMENTS 3,936,090 A     2/1976  Aya et al.
4,378,394 A  *  3/1983  Miura ................... B32B 27/065
                                                         428/113
(Continued)

FOREIGN PATENT DOCUMENTS

EP     0061132 B1 *  5/1987
EP     1520741 A2 *  4/2005    ............ B60J 5/0444
(Continued)

OTHER PUBLICATIONS

Machine translation of WO 2018021422 (Year: 2018).*

*Primary Examiner* — Dennis H Pedder
*Assistant Examiner* — Kevin P Weldon
(74) *Attorney, Agent, or Firm* — Birch, Stewart, Kolasch & Birch, LLP

(57) ABSTRACT

Provided is an automobile door (600) including: an exterior material (110); a first impact absorbing member (122); and a second impact absorbing member (124), in which the first impact absorbing member (122) is disposed to traverse the exterior material (110) so as to extend between both end portion regions in a vehicle height direction, the first impact absorbing member (122) is disposed on a vehicle interior side from the second impact absorbing member (124), the second impact absorbing member (124) is disposed to traverse the exterior material (110) so as to extend between both end portion regions in a vehicle length direction, the second impact absorbing member (124) is disposed adjacent to an inner surface of the exterior material (110), and at a portion excluding both of the end portion regions in the vehicle height direction, both of the end portion regions in the vehicle length direction, and an intersection portion, bending rigidity in a vehicle width direction of a cross section perpendicular to an extending direction of the first impact absorbing member (122) is larger than bending (Continued)

rigidity in the vehicle width direction of a cross section perpendicular to an extending direction of the second impact absorbing member (124).

8 Claims, 8 Drawing Sheets

(58) Field of Classification Search
USPC .............................................. 296/191, 146.6
See application file for complete search history.

(56) References Cited

U.S. PATENT DOCUMENTS

| | | | |
|---|---|---|---|
| 5,306,068 A | 4/1994 | Nakae et al. | |
| 2001/0038229 A1* | 11/2001 | Dettoni ................ | B60N 2/7094 |
| | | | 296/146.7 |
| 2012/0056445 A1* | 3/2012 | Golovashchenko ... | B62D 25/16 |
| | | | 29/897.2 |
| 2012/0244309 A1* | 9/2012 | Saur ........................ | B23B 5/12 |
| | | | 264/510 |
| 2019/0168587 A1 | 6/2019 | Suzuki et al. | |
| 2019/0168588 A1 | 6/2019 | Suzuki | |

FOREIGN PATENT DOCUMENTS

| | | | |
|---|---|---|---|
| JP | 2003-205741 A | | 7/2003 |
| KR | 960006440 Y1 | * | 7/1996 |
| KR | 97-003595 B1 | | 3/1997 |
| KR | 1998-048695 U | | 9/1998 |
| WO | WO 2018/021421 A1 | | 2/2018 |
| WO | WO 2018/021422 A1 | | 2/2018 |

\* cited by examiner

AUTOMOBILE DOOR

TECHNICAL FIELD OF THE INVENTION

The present invention relates to an automobile door.

This application claims the right of priority based on Japanese Patent Application No. 2019-004037 filed with the Japan Patent Office on Jan. 15, 2019, the content of which is incorporated herein by reference.

BACKGROUND ART

As the related art, for example, Patent Document 1 described below discloses a technique assumed to provide a door structure for an automobile, in which it is possible to achieve vibration suppression with a high level and panel stiffness improvement of a door outer panel while suppressing a weight increase and a cost increase.

PRIOR ART DOCUMENT

Patent Document

[Patent Document 1] Japanese Unexamined Patent Application, First Publication No. 2003-205741

DISCLOSURE OF THE INVENTION

Problems to be Solved by the Invention

In the technique disclosed in Patent Document 1 above, one strut extending in a vehicle height direction of the door and a door outer waist reinforcement and a guard bar extending in a vehicle length direction of the door are provided. Of these, the strut extending in the vehicle height direction of the door is provided to improve the panel stiffness, and the guard bar extending in the vehicle length direction is responsible for absorbing an impact due to a collision. However, an impact absorbing member such as the guard bar is installed so as to traverse the door. The end portions of the impact absorbing member are fixed, and the impact absorbing member absorbs an impact by being bent on the center side rather than the fixed portions. However, the inventors of the present invention have found that if the impact absorbing member is easily bent, there is a problem that the performance of the impact absorbing member cannot be fully exhibited.

Further, since the strut provided by only one is provided to improve the panel stiffness, it is not possible to absorb an impact around the strut. Further, the inventors of the present invention have found that in order to absorb an impact, it is necessary to provide a strong guard bar, which causes a problem of increasing the weight of the door.

The present invention has been made in view of the above problems, and an object of the present invention is to provide a new and improved automobile door capable of more reliably absorbing an impact.

Means for Solving the Problem (1) According to an aspect of the present invention, there is provided an automobile door including: an exterior material; a first impact absorbing member; and a second impact absorbing member, in which the first impact absorbing member is disposed to traverse the exterior material so as to extend between both end portion regions in a vehicle height direction, the first impact absorbing member is disposed on a vehicle interior side of the second impact absorbing member, the second impact absorbing member is disposed to traverse the exterior material so as to extend between both end portion regions in a vehicle length direction, the second impact absorbing member is disposed adjacent to an inner surface of the exterior material, the first impact absorbing member and the second impact absorbing member intersect with each other at an intersection portion, and at a portion excluding both of the end portion regions in the vehicle height direction, both of the end portion regions in the vehicle length direction, and the intersection portion, bending rigidity in a vehicle width direction of the cross section perpendicular to an extending direction of the first impact absorbing member is larger than bending rigidity in the vehicle width direction of a cross section perpendicular to an extending direction of the second impact absorbing member.

(2) In the automobile door according to the above (1), in the cross section perpendicular to the extending direction of the first impact absorbing member, a width in the vehicle width direction may be equal to or larger than a width in the vehicle length direction.

(3) In the automobile door according to the above (1) or (2), in the cross section perpendicular to the extending direction of the second impact absorbing member, a width in the vehicle width direction may be equal to or larger than a width in the vehicle height direction.

(4) In the automobile door according to any one of the above (1) to (3), at the intersection portion, a thickness in the vehicle width direction of the first impact absorbing member and/or the second impact absorbing member may be reduced.

(5) In the automobile door according to the above (4), at the intersection portion, the bending rigidity in the vehicle width direction of the cross section perpendicular to the extending direction of the first impact absorbing member may be larger than the bending rigidity in the vehicle width direction of the cross section perpendicular to the extending direction of the second impact absorbing member.

(6) In the automobile door according to any one of the above (1) to (5), the first impact absorbing member and/or the second impact absorbing member may be joined to the exterior material.

(7) In the automobile door according to any one of the above (1) to (6), the first impact absorbing member and the second impact absorbing member may be joined to each other.

(8) In the automobile door according to any one of the above (1) to (7), a plurality of the first impact absorbing members and/or a plurality of the second impact absorbing members may be provided.

Effects of the Invention

As described above, according to the present invention, it is possible to provide an automobile door capable of more reliably absorbing an impact.

EMBODIMENTS OF THE INVENTION

Figure 1:
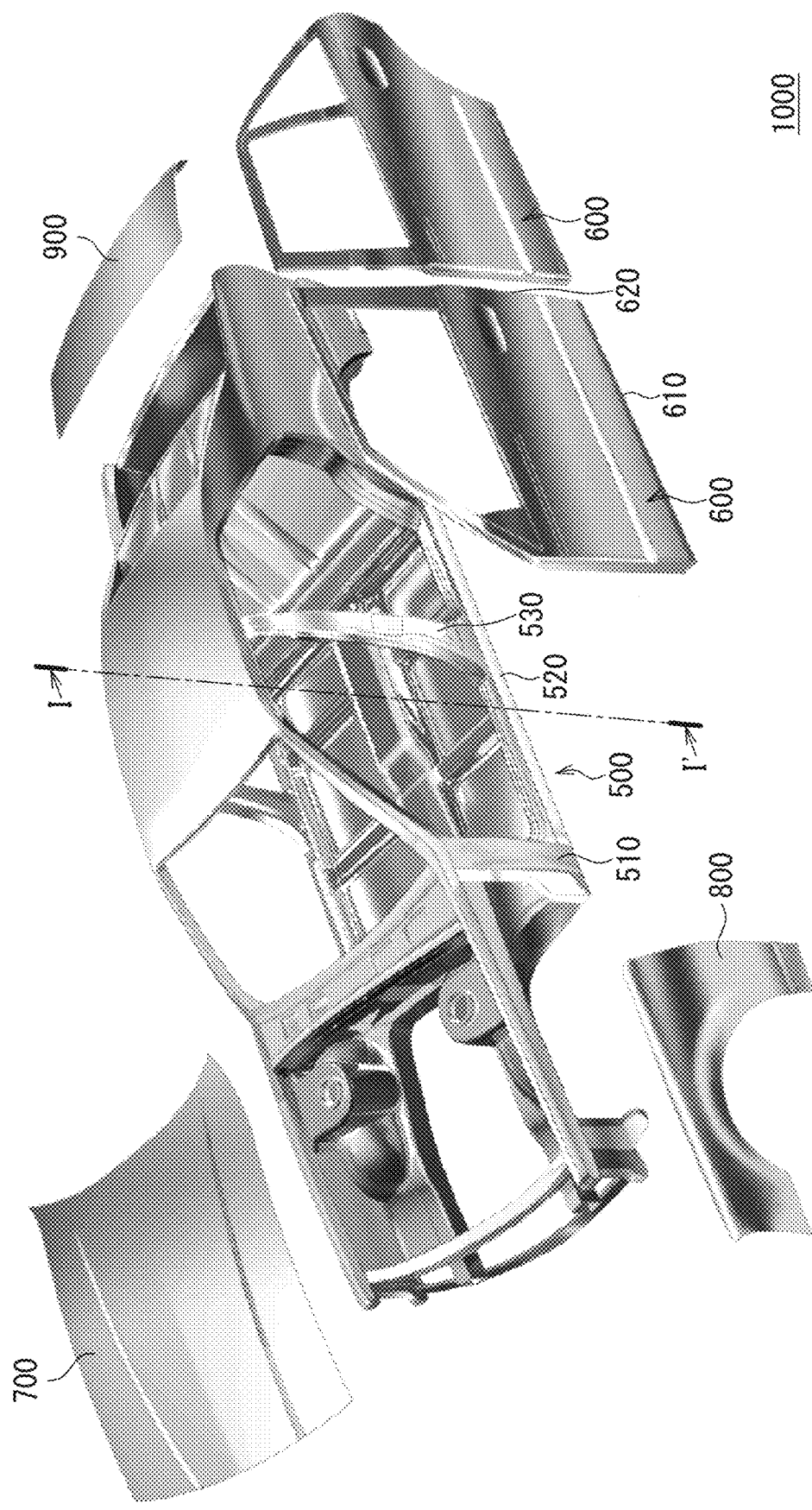
FIG. 1 is a perspective view showing a structure of an automobile according to an embodiment of the present invention.

Hereinafter, a preferred embodiment of the present invention will be described in detail with reference to the accompanying drawings. In this specification and the drawings, constituent elements having substantially the same functional configuration are denoted by the same reference numerals, whereby overlapping description is omitted.

In recent years, application of a high tensile strength steel sheet to an automobile exterior has been studied. If the high tensile strength steel sheet is applied, the sheet thickness of the steel sheet becomes thin, and thus a reduction in the weight of an exterior material of the automobile can be attained. For example, if the high tensile strength steel sheet is applied to an exterior material having a conventional sheet thickness of 0.7 mm, it is expected that even if the sheet thickness is 0.4 mm, dent resistance equivalent to that in the conventional sheet thickness of 0.7 mm can be obtained. However, since the panel stiffness of the exterior material depends on the sheet thickness, if the sheet thickness is reduced, the panel stiffness becomes insufficient. In other words, if the sheet thickness is reduced, the exterior material is easily deformed in a case where the exterior material is pushed by the hand. On the other hand, in PCT International Publication No. WO2018/021422, the inventors of the present invention disclosed impact absorbing members disposed lengthwise and breadthwise inside an exterior panel, and attained a reduction in weight without reducing the panel stiffness or the impact resistance performance even if the sheet thickness of the exterior material is reduced. In this regard, the present application is to achieve a further reduction in the weight of the exterior material of the automobile.

FIG. 1 is a perspective view showing the structure of an automobile 1000 according to an embodiment of the present invention. As shown in FIG. 1, the automobile 1000 is provided with constituent elements such as a body 500, a door 600 (a front door and/or a rear door), a bonnet 700, a fender 800, and a trunk lid 900. In the present embodiment, the automobile 1000, in particular, the structure in the vicinity of the door 600, will be described. The present invention can be applied to not only a door that is mounted to a vehicle body through a hinge but also a sliding door.

Usually, the door 600 and the body 500 are connected such that the door 600 can rotate with respect to the body 500, through a door hinge provided at an A pillar 510 (also referred to as a front pillar) of the body 500 (or a door hinge provided at a B pillar 530).

Figure 2:
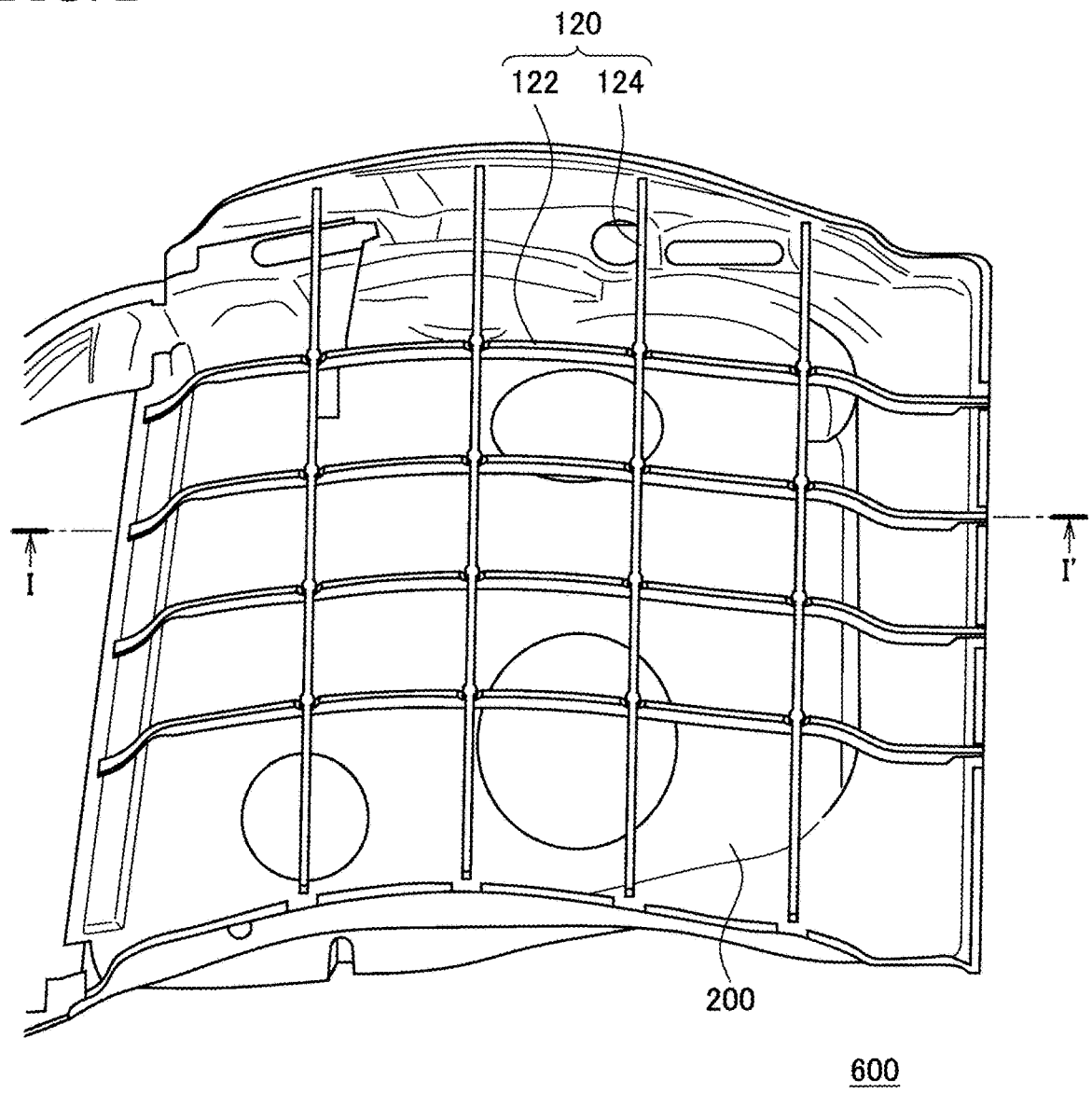
FIG. 2 is a schematic diagram showing a structure of a door according to the present embodiment.
Figure 3:
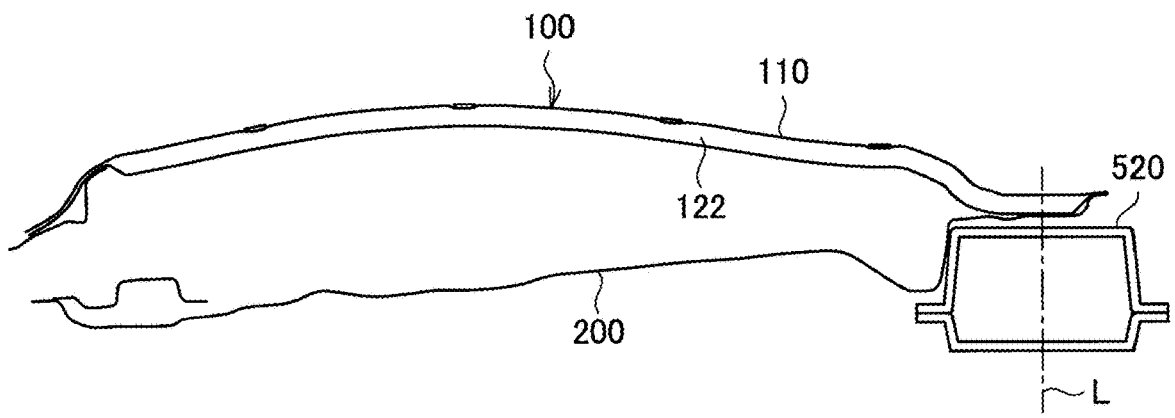
FIG. 3 is a schematic diagram showing a cross section along a one-dot chain line I-I' shown in FIG. 2 in a state where the door according to the present embodiment is closed with respect to a body.

FIG. 2 is a schematic diagram showing the structure of the door 600 and shows a state where the door 600 is viewed from the outside of the automobile 1000. For convenience of description, in FIG. 2, only an impact absorbing member 120 of an exterior panel 100 (described later) is shown, and an exterior material 110 is not shown. Further, FIG. 3 is a schematic diagram showing a cross section along a one-dot chain line I-I' shown in FIG. 2 in a state where the door 600 is closed with respect to the body 500. The position of the one-dot chain line I-I' shown in FIG. 2 corresponds to the position of the one-dot chain line I-I' shown in FIG. 1.

In a case where the door 600 is a door (front door) on the front seat side of the automobile, in a state where it is closed with respect to the body 500, a lower end portion 610 thereof is adjacent to a side sill 520 of the body 500 with a side panel interposed therebetween, and an end portion 620 on the rear side of the door 600 on the front seat side of the automobile is adjacent to the B pillar 530 (also referred to as a center pillar) of the body 500 with a side panel interposed therebetween. The A pillar 510 and the B pillar 530 are also collectively referred to as a pillar.

As shown in FIG. 3, the door 600 is provided with the exterior panel 100. The exterior panel 100 is a panel whose front side is exposed to the outside of the automobile 1000. The surface on the front side of the exterior panel 100 is painted according to the color of the automobile 1000.

The exterior panel 100 includes the exterior material 110 and the impact absorbing member 120. The exterior material 110 is made of a steel sheet having a thickness in a range of about 0.4 to 0.7 mm, as an example. As an example, the exterior material 110 is curved such that the front side thereof is convex. That is, the exterior material 110 is curved in a cross section perpendicular to a vehicle length direction.

Figure 4:
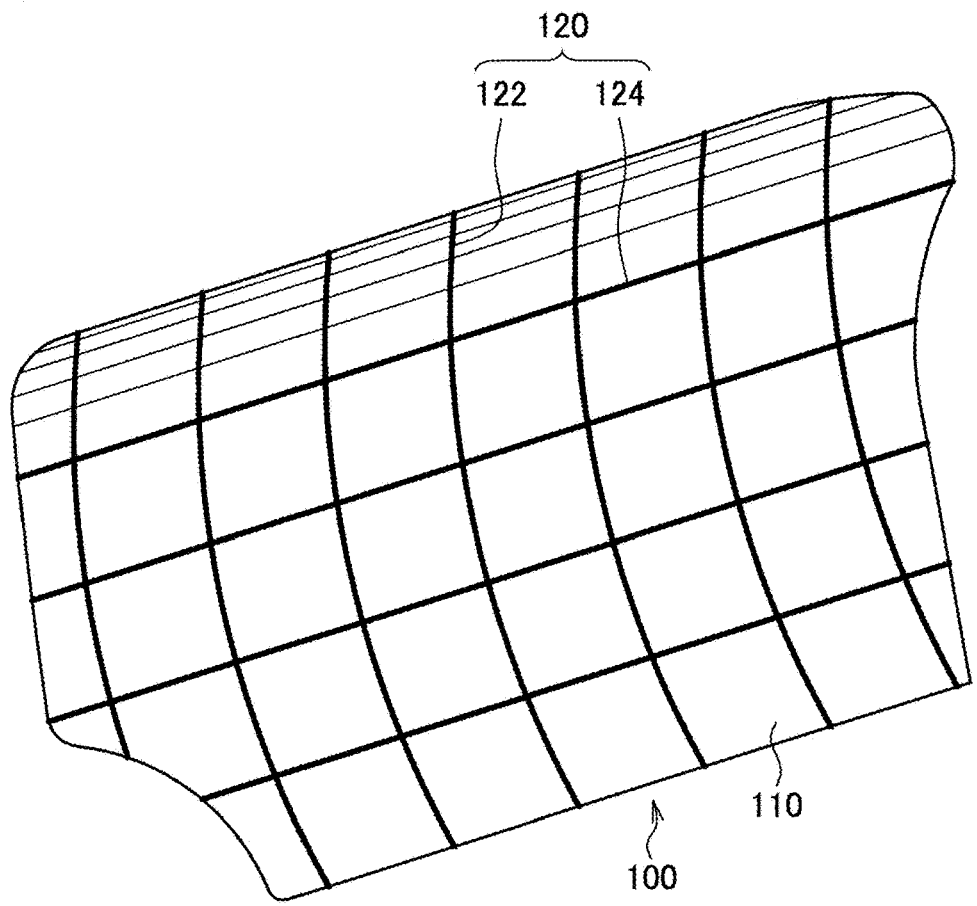
FIG. 4 is a schematic diagram showing a state where an exterior panel according to the present embodiment is viewed from the back side (the inside of the automobile).

FIG. 4 is a schematic diagram showing a state where the exterior panel 100 is viewed from the back side (the inside of the automobile). The impact absorbing member 120 includes a first impact absorbing member 122 disposed to traverse the exterior panel 100 so as to extend between both end portion regions in a vehicle height direction in the exterior panel 100, and a second impact absorbing member 124 disposed to traverse the exterior panel 100 so as to extend between both end portion regions in the vehicle length direction in the exterior panel 100.

Here, the "both end portion regions in the vehicle height direction in the exterior panel 100" mean two regions each extending up to 20% inward from each of both end portions (upper and lower end portions) in the vehicle height direction of the exterior panel 100.

Further, the "both end portion regions in the vehicle length direction in the exterior panel 100" mean two regions each extending up to 10% inward from each of both end portions (front and rear end portions) in the vehicle length direction of the exterior panel 100.

It is desirable that the first impact absorbing member 122 is curved to follow the shape of the exterior material 110. The second impact absorbing member 124 extends substantially linearly and parallel to the vehicle length direction. However, in a case where the exterior material 110 is curved in a cross section perpendicular to the vehicle height direction, it is desirable that the second impact absorbing member 124 has a shape following the curved shape of the exterior material 110. This is because, if the first impact absorbing member 122 and the second impact absorbing member 124 have shapes following the exterior material 110, the first impact absorbing member 122 and the second impact absorbing member 124 can be in close contact with the exterior material 110 and be preferably joined (bonded) to the exterior material 110. If the first impact absorbing member 122 or the second impact absorbing member 124 is joined to the exterior material 110, when the first impact absorbing member 122 or the second impact absorbing member 124 is deformed, the exterior material 110 resists deformation. That is, because the exterior material 110 can contribute to impact absorption, it is more preferable.

Figure 5:
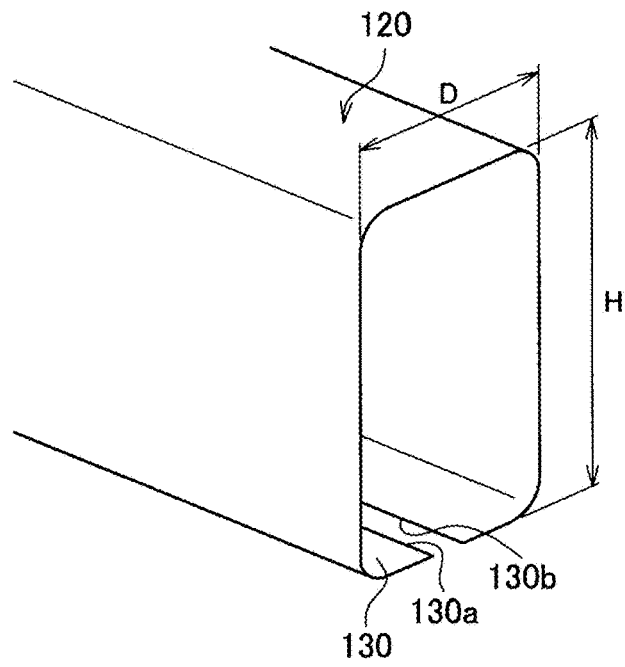
FIG. 5 is a schematic perspective view showing an example of a configuration of an impact absorbing member according to the present embodiment.

FIG. 5 is a perspective view showing an example of the configuration of the impact absorbing member 120. The basic configurations of the first impact absorbing member 122 and the second impact absorbing member 124 can be the same. FIG. 5 also shows a cross-sectional configuration orthogonal to a longitudinal direction of the impact absorbing member 120. In the example shown in FIG. 5, the impact absorbing member 120 has a hollow rectangular (oblong) cross section. The impact absorbing member 120 is manufactured by bending a sheet material 130. Further, the impact absorbing member 120 may be manufactured with a hollow tubular member or a solid rod-shaped member. Further, the impact absorbing member 120 may have a hollow or solid trapezoidal cross section. Further, it is preferable that in the cross section of the first impact absorbing member 122 disposed in the vehicle height direction, the width in the vehicle width direction is equal to or larger than the width in the vehicle length direction, and in the cross section of the second impact absorbing member 124 disposed in the vehicle length direction, the width in the vehicle width direction is equal to or larger than the width in the vehicle height direction. In the example shown in FIG. 5, the impact absorbing member 120 has an oblong cross-sectional shape, and one side thereof has a long side H in a range of about 6 to 20 mm and a short side D in a range of about 6 to 16 mm. Further, the sheet thickness of the sheet material 130 forming the impact absorbing member 120 is in a range of about 0.6 to 1.2 mm, as an example. As the sheet material 130, a steel sheet can be used. The tensile strength of the first impact absorbing member 122 and the second impact absorbing member 124 is preferably 980 MPa or more, and more preferably 1470 MPa or more. Further, in a case where the first impact absorbing member 122 and the second impact absorbing member 124 are formed from a steel sheet by press forming, cold forming may be used, or hot stamping may be adopted depending on the strength of the steel sheet.

As shown in FIG. 5, a predetermined gap may be provided between an end portion 130a and an end portion 130b of the bent sheet material 130. On the other hand, the end portion 130a and the end portion 130b may be in close contact with each other. Further, the end portion 130a and the end portion 130b may be joined to each other by welding, bonding, or the like. The cross section of the impact absorbing member 120 does not need to have a continuous rectangular shape, annular shape, or trapezoidal shape, and may have a discontinuous shape due to the presence of a gap. Further, in a case where end portions are present in the cross section of the impact absorbing member 120, the end portions may be in close contact with each other, or the end portions may be joined to each other by welding, bonding, or the like.

The impact absorbing member 120 is disposed such that the surface on which the end portions 130a and 130b are located or the surface opposite to the surface on which the end portions 130a and 130b are located is in close contact with the exterior material 110. Preferably, the surface on which the end portions 130a and 130b are located or the surface opposite to the surface on which the end portions 130a and 130b are located is joined to the exterior material 110.

As shown in FIGS. 2 and 3, a door inner panel 200 is provided inside the exterior panel 100. As an example, the door inner panel 200 is made of a steel sheet. The further inner side of the door inner panel 200 faces the vehicle interior, and is usually provided with an interior material made of leather or a resin material.

Next, the structure of the portion where the lower end portion 610 of the door 600 and the side sill 520 are adjacent to each other will be described. As shown in FIG. 3, the first impact absorbing member 122 extends to the vicinity of the lower end of the door 600. Similarly, the door inner panel 200 also extends to the vicinity of the lower end of the door 600. Therefore, at the portion where the lower end portion 610 of the door 600 and the side sill 520 are adjacent to each other, the first impact absorbing member 122 is interposed between the exterior panel 100 and the side sill 520.

At this time, since all of the four first impact absorbing members 122 shown in FIG. 2 extend to the vicinity of the lower end of the door 600, at the portion where the lower end portion 610 of the door 600 and the side sill 520 are adjacent to each other, the four first impact absorbing members 122 are interposed between the exterior panel 100 and the side sill 520. In other words, at the lower portion of the door 600, the first impact absorbing member 122 extending in the vehicle height direction, the door inner panel 200, and the side sill 520 are disposed in this order on the same line in the vehicle width direction (a straight line L shown in FIG. 3). According to such a structure, it is possible to significantly improve the impact absorbing performance in a case where another structure (a vehicle, a building, a utility pole, or the like) collides with the side surface of the automobile 1000.

When the side surface of the automobile 1000 collides with another structure and the door 600 is deformed, the first impact absorbing member 122 first receives a load and transmits the load to the side sill 520. That is, the side sill 520 can support the first impact absorbing member 122 to receive the load. In other words, the first impact absorbing member 122 and the side sill 520 can prevent the door 600 provided with the first impact absorbing member 122 from invading the vehicle interior side.

In order to efficiently transmit the load, it is desirable that the cross section of the first impact absorbing member 122 has an annular shape or a rectangular shape as shown in FIG. 5 on the same line described above. This is because if the first impact absorbing member 122 is a flat plate, there is a possibility that it may be broken without almost transmitting the load.

Specifically, the absorption of the load (impact energy) due to an impact is performed as follows. First, the collision load is applied to the impact absorbing member 120 at the central portion in the vehicle height direction of the door 600 (step 1). Next, at the lower portion in the vehicle height direction of the door 600, the end portion of the first impact absorbing member 122 is deformed or moved toward the vehicle interior side in the vehicle width direction together with the door inner panel 200 (step 2). Then, the first impact absorbing member 122 approaches the vehicle exterior side in the vehicle width direction of the side sill 520 with the door inner panel 200 interposed therebetween, the first impact absorbing member 122 is supported by the side sill 520, and the first impact absorbing member 122 is deformed to absorb impact energy (step 3).

If the first impact absorbing member 122 and the side sill 520 are not on the same line in the vehicle width direction, step 3 described above does not occur. Further, if the cross section of the first impact absorbing member 122 does not have an annular shape or a rectangular shape on the same line and has, for example, a flat plate shape, the effect of step 3 described above cannot be sufficiently exhibited. This is because bending occurs at a weak point (a point of a flat plate) of the first impact absorbing member 122.

In general, a side panel is interposed between the door inner panel 200 and the side sill 520. However, since the contribution of the side panel to impact absorption is small, in the above description, the description regarding the side panel is omitted.

Figure 6:
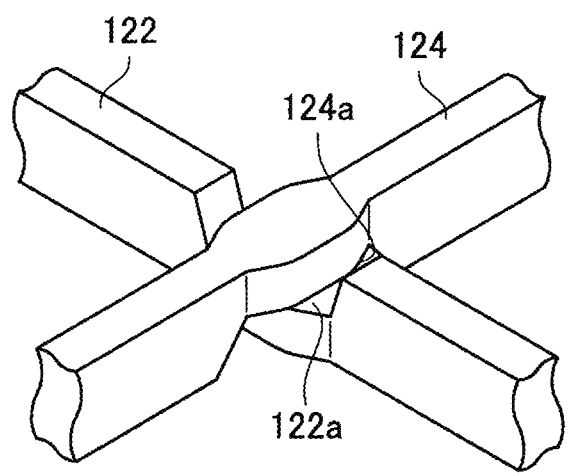
FIG. 6 is a schematic perspective view showing in detail an example of an intersection portion by a first impact absorbing member and a second impact absorbing member according to the present embodiment.

FIG. 6 is a perspective view showing in detail an example of an intersection portion by the first impact absorbing member 122 and the second impact absorbing member 124. FIG. 6 shows a state where the first impact absorbing member 122 and the second impact absorbing member 124 are viewed from the outside (the exterior material 110 side) of the vehicle. At the intersection portion, the second impact absorbing member 124 is located in the direction of the outside (on the exterior material 110 side) of the vehicle with respect to the first impact absorbing member 122. As shown in FIG. 6, the first impact absorbing member 122 may be provided with a recessed part 122a, and the second impact absorbing member 124 may be provided with a recessed part 124a. In other words, at the intersection portion of the first impact absorbing member 122 and the second impact absorbing member 124, the thickness in the vehicle width direction of the first impact absorbing member 122 and/or the second impact absorbing member 124 may be reduced. In this way, the first impact absorbing member 122 and the second impact absorbing member 124 are disposed in the same plane.

The second impact absorbing member 124 is located in the direction of the outside (on the exterior material 110 side) of the vehicle with respect to the first impact absorbing member 122, whereby in a case where another structure collides with the exterior panel 100 of the door 600, the load is transmitted from the exterior material 110 to the second impact absorbing member 124. Then, the second impact absorbing member 124 is disposed in the vehicle length direction. Therefore, the load is transmitted from the intersection portion shown in FIG. 6 to a plurality of the first impact absorbing members 122. Then, the plurality of the first impact absorbing members 122 are disposed in the vehicle height direction and overlap the side sill 520 at the lower end portion 610 of the door 600. Therefore, the load is dispersed to the side sill 520. The side sill 520 is a part of the body 500, which is a frame member of the automobile 1000, and has very high strength. In this way, the load due to a collision can be received by the body 500, and the load is dispersed to the body 500, so that it becomes possible to more reliably absorb an impact.

Here, the significance of providing the plurality of the first impact absorbing members 122 will be described in more detail. In general, there is not enough space inside the door 600 at the position adjacent to the side sill 520, and in particular, the space in the vehicle width direction is very limited. Therefore, it is difficult to make the first impact absorbing member 122 thick. Therefore, in a case where only one first impact absorbing member 122 is provided in this limited space, it is not possible to sufficiently absorb the load.

Further, in a case where only one first impact absorbing member 122 is provided, if an impact is applied to the door 600, an extremely large load is transmitted from the one first impact absorbing member 122 to the side sill 520. That is, it is also assumed that the side sill 520 is damaged. Then, if the side sill 520 is damaged, there is a possibility that the door 600 may invade toward the vehicle interior side. In order to prevent the side sill 520 from being damaged, it is conceivable to further strengthen the side sill 520. However, since the side sill 520 is a part of the body 500 which is a frame member of the automobile 1000, there is a concern that the weight of the automobile 1000 may increase with the strengthening.

As in the present embodiment, it is preferable to dispose a plurality of the first impact absorbing members 122 such that the load is dispersed and transmitted to the side sill 520. In this case, damage to the side sill 520 can be suppressed without specially strengthening the side sill 520. Therefore, the situation where the door 600 invades toward the vehicle interior side can also be more reliably prevented.

Two or more, three or more, or four or more first impact absorbing members 122 may be provided with respect to one exterior panel 100 or one door inner panel 200. For example, in a case where a collision with a structure such as a utility pole is assumed, in order to reliably receive the load even if any portion of the door 600 in the vehicle length direction collides, the number of the first impact absorbing members 122 is preferably three or more, and in order to prevent an increase in weight due to excessive installation of the first impact absorbing members 122, the number of the first impact absorbing members 122 is preferably six or less. It is more preferable that the number of the first impact absorbing members 122 is four or five.

Two or more, three or more, or four or more second impact absorbing members 124 may be provided with respect to one exterior panel 100 or one door inner panel 200. In order to disperse the load due to a collision by transmitting the load to a wide range above and below in the vehicle height direction of the first impact absorbing member 122, the number of the second impact absorbing members 124 is preferably two or more, and in order to prevent an increase in weight due to excessive installation of the second impact absorbing members 124, the number of the second impact absorbing members 124 is preferably five or less. It is more preferable that the number of the second impact absorbing members 124 is three or four.

The first impact absorbing member 122 and the second impact absorbing member 124 are in close contact with the exterior material 110, whereby the effect of improving the panel stiffness of the exterior material 110 can also be obtained. The length of one side of the region that is divided by the first impact absorbing member 122 and the second impact absorbing member 124 is preferably 300 mm or less and more preferably 200 mm or less in a case of being viewed along the vehicle width direction in a state where the door is closed with respect to the body, such that good panel stiffness can be obtained even in a case where the thickness of the exterior material 110 is as thin as 0.4 mm, for example.

In this manner, in the automobile door according to the present embodiment, the load due to a collision is dispersed to the plurality of the first impact absorbing members 122 extending in the vehicle height direction and transmitted to the side sill 520. Therefore, since the load is transmitted to be dispersed in the vehicle length direction of the side sill 520, the load is not locally applied to only a region of a part of the side sill 520. Therefore, it is not necessary to reinforce especially the side sill 520, and it is possible to effectively absorb an impact with the normal structure of the body 500.

As described above, the second impact absorbing member 124 in the vehicle length direction has a function of transmitting an impact load to the first impact absorbing member 122 in the vehicle height direction. Then, the impact load is mainly absorbed by the first impact absorbing member 122 in the vehicle height direction.

Then, at a portion excluding both end portion regions in the vehicle height direction, both end portion regions in the vehicle length direction, and the intersection portion, the bending rigidity (longitudinal elastic coefficient×second moment of a cross section) (around the axis in the vehicle length direction) in the vehicle width direction of the cross section of the first impact absorbing member 122 extending in the vehicle height direction is larger than the bending rigidity (around the axis in the vehicle height direction) in the vehicle width direction of the cross section of the second impact absorbing member 124 extending in the vehicle length direction. In particular, the bending rigidity in the vehicle width direction of the cross section of the first impact absorbing member 122 is preferably 1.5 times or more, more preferably 5 times or more, and further preferably 10 times or more larger than the bending rigidity in the vehicle width direction of the cross section of the second impact absorbing member 124.

Further, it is preferable that also at the intersection portion, the bending rigidity in the vehicle width direction of the cross section of the first impact absorbing member 122 is larger than the bending rigidity in the vehicle width direction of the cross section of the second impact absorbing member 124. Also in this case, as in the above, it is preferably 1.5 times or more larger, and further preferably 10 times or more larger.

Further, the bending rigidity in the vehicle width direction of the cross section of the first impact absorbing member 122 at the intersection portion may be larger than the bending rigidity in the vehicle width direction of the cross section of the second impact absorbing member 124 at the portion excluding both end portion regions in the vehicle length direction and the intersection portion. Also in this case, as in the above, it may be 1.5 times or more larger, and may be 5 times or more larger.

The cross section means a cross section perpendicular to the extending direction of the impact absorbing member.

The reason why the bending rigidity of the first impact absorbing member 122 is made larger than that of the second impact absorbing member 124 is as follows. In many cases, the door 600 of the automobile is configured such that the length in the vehicle length direction is longer when the lengths in the vehicle length direction and the vehicle height direction are compared. In the impact absorbing members having the same cross-sectional shape, in a case where both end portions thereof are supported, the longer member is more easily deformed when a load is applied to the center. Therefore, when the second impact absorbing member 124 that traverses in the vehicle length direction and the first impact absorbing member 122 that traverses in the vehicle height direction are compared, in the case of the same cross-sectional shape, the first impact absorbing member 122 that traverses in the vehicle height direction is stronger. Further, in the exterior material 110 of the door 600 of the automobile, when the shape in the vehicle length direction and the shape in the vehicle height direction are compared, in many cases, the shape in the vehicle height direction of the cross section perpendicular to the vehicle length direction has large curvature in which the outside in the vehicle width direction is convex. Considering a case where the impact absorbing member 120 has a shape along the exterior material 110, in a case where the impact absorbing member 120 receives a load toward the inside in the vehicle width direction, that is, in a case where a collision load is received by the side surface of the automobile 1000, the axial force of compression acts on the first impact absorbing member 122 having large curvature in which the outside in the vehicle width direction is convex. Therefore, the deformation toward the inside in the vehicle width direction is further suppressed. That is, the first impact absorbing member 122 can withstand a larger load than the second impact absorbing member 124. In other words, the first impact absorbing member 122 extending in the vehicle height direction has higher impact absorbing performance. Therefore, in order to more efficiently improve the impact absorbing performance of the door 600, it is better to make the bending rigidity of the first impact absorbing member 122 larger than that of the second impact absorbing member 124.

In order to transmit the impact load applied to the second impact absorbing member 124 in the vehicle length direction to the first impact absorbing member 122 in the vehicle height direction, the second impact absorbing member 124 in the vehicle length direction is disposed on the vehicle exterior side (the exterior material side) from the first impact absorbing member 122 in the vehicle height direction. At this time, since the main role of the second impact absorbing member 124 is to transmit a load to the first impact absorbing member 122, the influence of a reduction in the bending rigidity of the second impact absorbing member 124 on the impact absorbing performance of the door 600 is smaller than the influence of a reduction in the bending rigidity of the first impact absorbing member 122. Since the bending rigidity is reduced in a case where the cross section of the impact absorbing member 120 is reduced or the sheet thickness of the constituent sheet material is reduced, the bending rigidity of the first impact absorbing member 122 is set to be relatively large and the bending rigidity of the second impact absorbing member 124 is set to be relatively small, whereby it becomes possible to efficiently improve the impact absorbing performance of the door 600 without an excessive increase in weight.

In a case where the bending rigidity in the vehicle width direction of the cross section of the second impact absorbing member 124 is larger than the bending rigidity in the vehicle width direction of the cross section of the first impact absorbing member 122, the weight of the second impact absorbing member 124 becomes larger than necessary, which does not meet the purpose of reducing the weight of the door 600 intended in the present embodiment.

Figure 7:
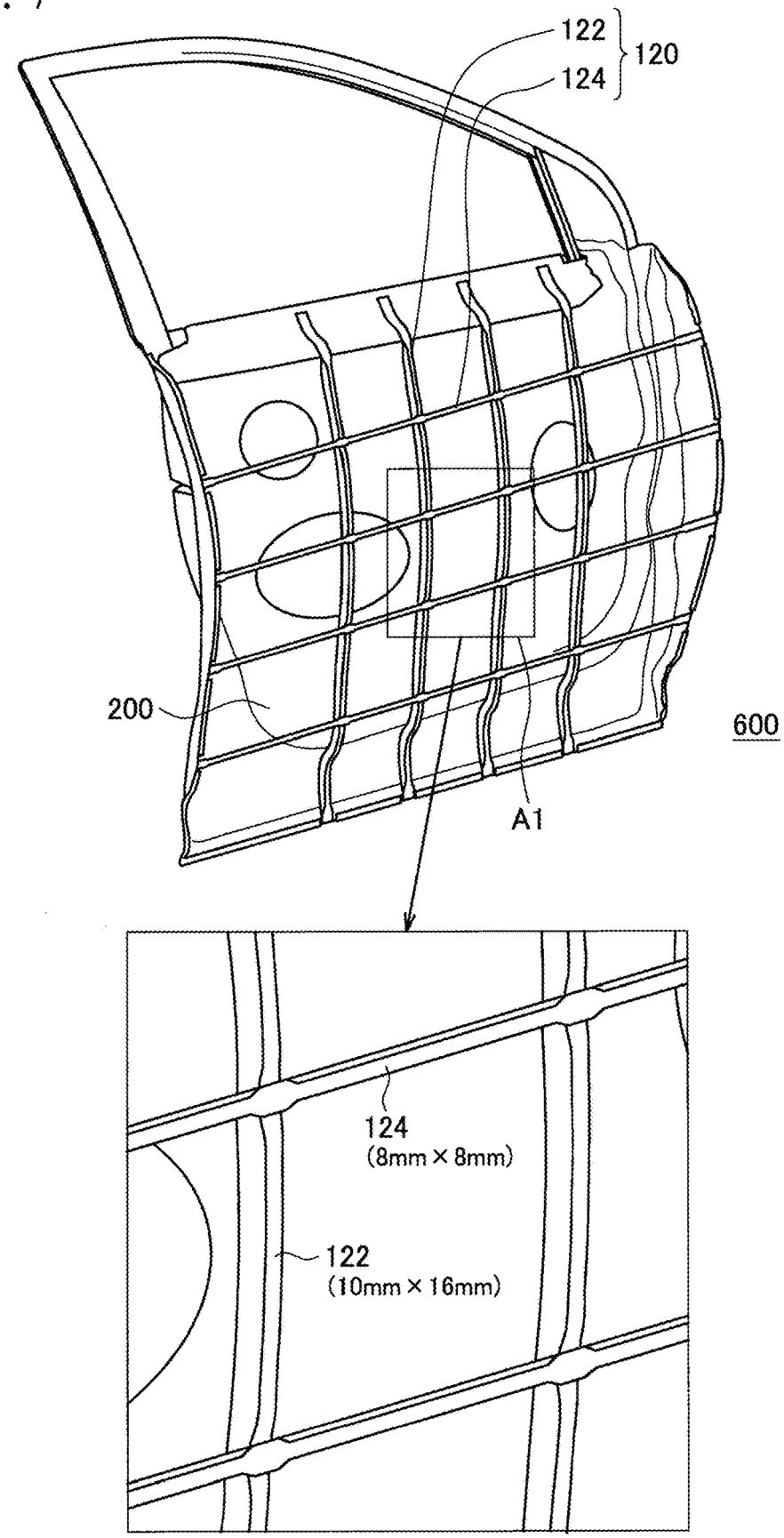
FIG. 7 is a schematic diagram showing the structure of the door according to the present embodiment.
Figure 8:
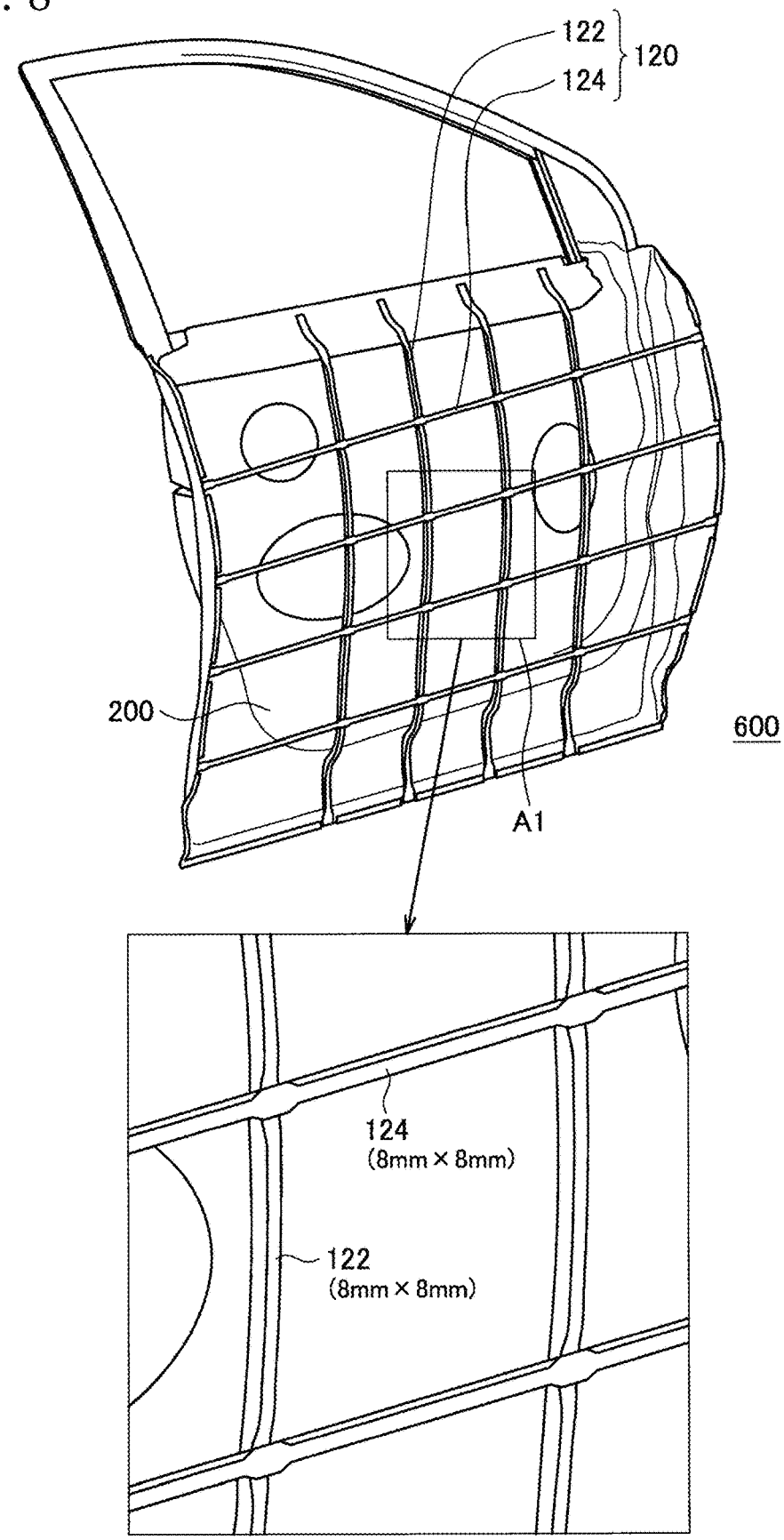
FIG. 8 is a schematic diagram showing a structure of a door according to Comparative Example 1.
Figure 9:
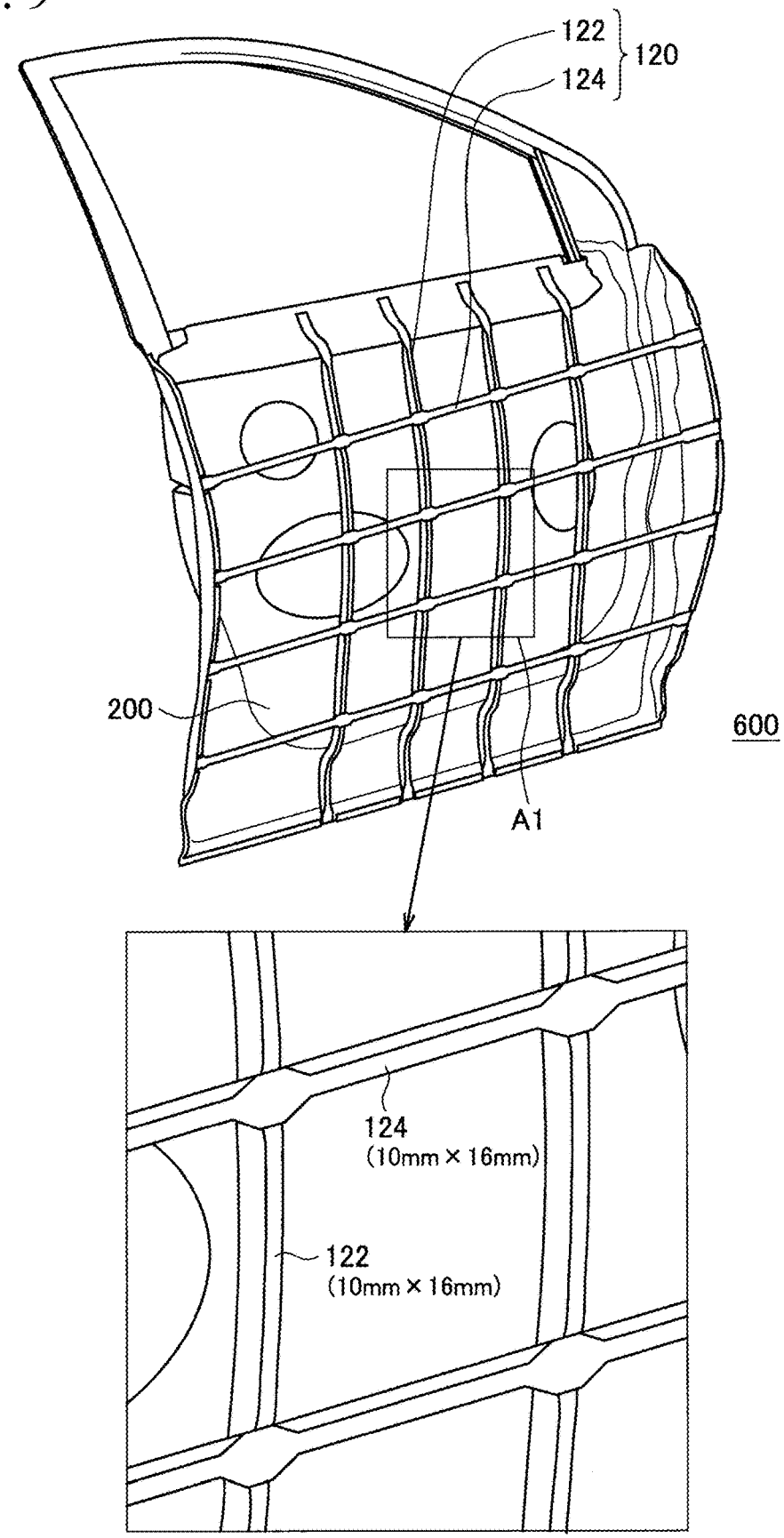
FIG. 9 is a schematic diagram showing a structure of a door according to Comparative Example 2.

Next, the above-described embodiment of the present invention and comparative examples thereof will be described based on FIGS. 7 to 9. FIGS. 7 to 9 show a state where the door 600 is viewed from the outside of the automobile 1000, as in FIG. 2, and the exterior panel 100 is not shown. Further, the drawings shown below in FIGS. 7 to 9 are schematic diagrams showing an area A1 of the door 600 in an enlarged manner.

FIG. 7 is a schematic diagram showing the structure of the door 600 according to the present embodiment. The structure shown in FIG. 7 corresponds to the structure shown in FIG. 2. In the door 600 of the present embodiment shown in FIG. 7, as the first impact absorbing member 122, a member in which the long side H shown in FIG. 5 is 16 mm and the short side D shown in FIG. 5 is 10 mm is used. Further, in the door 600 of the present embodiment shown in FIG. 7, as the second impact absorbing member 124, a member in which the long side H is 8 mm and the short side D is 8 mm is used. In this case, the bending rigidity in the vehicle width direction of the cross section of the first impact absorbing member 122 of the present embodiment is relatively larger than the bending rigidity in the vehicle width direction of the cross section of the second impact absorbing member 124 of the present embodiment.

Further, FIG. 8 is a schematic diagram showing the structure of the door 600 according to Comparative Example 1. In the door 600 of Comparative Example 1, as the first impact absorbing member 122, a member in which the long side H shown in FIG. 5 is 8 mm and the short side D is 8 mm is used. Further, in the door 600 of Comparative Example 1, as the second impact absorbing member 124, a member in which the long side H is 8 mm and the short side D is 8 mm is used. In this case, the bending rigidity in the vehicle width direction of the cross section of the first impact absorbing member 122 of Comparative Example 1 and the bending rigidity in the vehicle width direction of the cross section of the second impact absorbing member 124 of Comparative Example 1 are the same. Further, the bending rigidity in the vehicle width direction of the cross sections of the first impact absorbing member 122 and the second impact absorbing member 124 of Comparative Example 1 is the same as the bending rigidity in the vehicle width direction of the cross section of the second impact absorbing member 124 of the present embodiment shown in FIG. 7, and is relatively smaller than the bending rigidity in the vehicle width direction of the cross section of the first impact absorbing member 122 of the present embodiment.

Further, FIG. 9 is a schematic diagram showing the structure of the door 600 according to Comparative Example 2. In the door 600 of Comparative Example 2, as the first impact absorbing member 122, a member in which the long side H shown in FIG. 5 is 16 mm and the short side D shown in FIG. 5 is 10 mm is used. Further, in the door 600 of Comparative Example 2, as the second impact absorbing member 124, a member in which the long side H is 16 mm and the short side D is 10 mm is used. In this case, the bending rigidity in the vehicle width direction of the cross section of the first impact absorbing member 122 of Comparative Example 2 and the bending rigidity in the vehicle width direction of the cross section of the second impact absorbing member 124 of Comparative Example 2 are the same. Further, the bending rigidity in the vehicle width direction of the cross sections of the first impact absorbing member 122 and the second impact absorbing member 124 of Comparative Example 2 is the same as the bending rigidity in the vehicle width direction of the cross section of the first impact absorbing member 122 of the present embodiment shown in FIG. 7, and is relatively larger than the bending rigidity in the vehicle width direction of the cross section of the second impact absorbing member 124 of the present embodiment.

Figure 10:
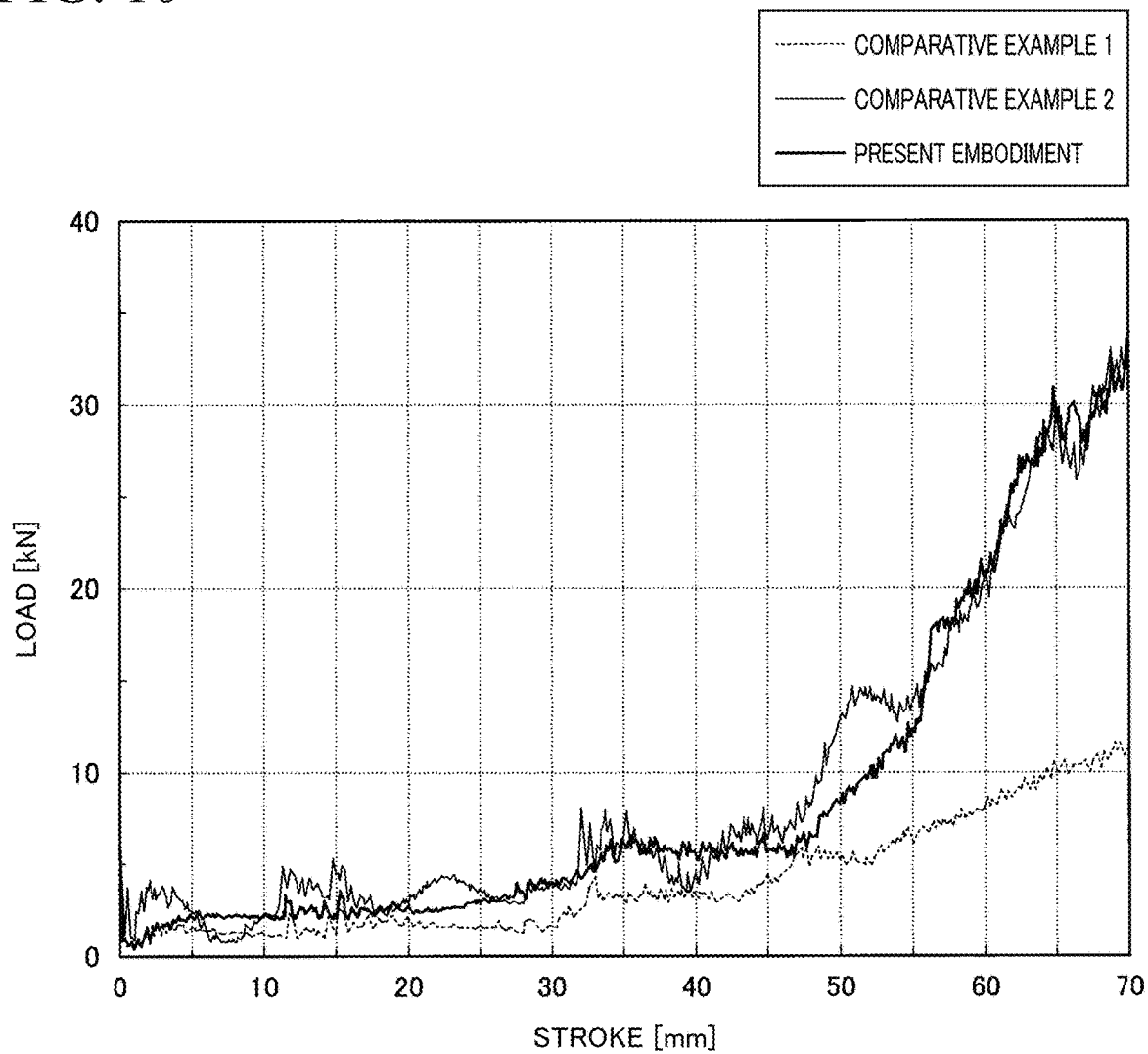
FIG. 10 is a characteristic diagram showing the relationship between a stroke of an indenter and a load that the indenter receives, in a case where an exterior panel of a door is pushed by the indenter, with respect to the configuration of the present embodiment shown in FIGS. 2 and 7 and the configurations of Comparative Examples 1 and 2 shown in FIGS. 8 and 9.

FIG. 10 is a characteristic diagram in which assuming a case where the center of the exterior panel 100 of the door 600 is pushed by a columnar indenter having a radius of 300 mm and an axis in the vehicle height direction, the relationship between the stroke of the indenter and a load that the indenter receives from the door 600 is obtained by simulation, with respect to the configuration of the embodiment of the present invention shown in FIG. 7 and the configurations of Comparative Examples 1 and 2 shown in FIGS. 8 and 9.

As shown in FIG. 10, in contrast to the load characteristic of Comparative Example 1 in which both the first impact absorbing member 122 and the second impact absorbing member 124 have small bending rigidity, the load characteristic of the present embodiment in which the bending rigidity of the first impact absorbing member 122 is made larger than that in Comparative Example 1 and the bending rigidity of the second impact absorbing member 124 is small bending rigidity as in Comparative Example 1 is greatly improved.

Further, the load characteristic of Comparative Example 2 in which both the first impact absorbing member 122 and the second impact absorbing member 124 have large bending rigidity as in the first impact absorbing member 122 of the present embodiment is almost the same as that in the present embodiment. Therefore, it is found that in the configuration of Comparative Example 2, the improvement in impact absorbing performance corresponding to a weight increase according to an increase in the cross-sectional size of the second impact absorbing member 124 is not obtained.

From the above, it is found that the configuration example of the present embodiment in which the bending rigidity of the first impact absorbing member 122 is larger than that of the second impact absorbing member 124 is most excellent in impact absorbing performance and weight reduction effect, compared to Comparative Examples 1 and 2.

In the above description, the case is an exemplary example where each of the members such as the first impact absorbing member 122, the second impact absorbing member 124, and the door inner panel 200 is made of a steel sheet. However, these members may be made of other materials such as aluminum, an aluminum alloy, and CFRP (carbon fiber reinforced plastic).

As described above, according to the present embodiment, the second impact absorbing member 124 extending in the vehicle length direction is disposed on the vehicle exterior side from the first impact absorbing member 122 extending in the vehicle height direction, and the bending rigidity in the vehicle width direction of the cross section of the first impact absorbing member 122 is made larger than the bending rigidity in the vehicle width direction of the cross section of the second impact absorbing member 124. In this way, in a case where a collision load is applied to the door 600, the load is transmitted from the second impact absorbing member 124 to the first impact absorbing member 122, and the load can be more reliably received by the first impact absorbing member 122.

The preferred embodiment of the present invention has been described in detail above with reference to the accompanying drawings. However, the present invention is not limited to such an example. It is clear that by a person having ordinary knowledge in the field of the technique to which the present invention belongs, various change examples or modification examples can be conceived within the scope of the technical idea of the present invention and it will be understood that these examples also naturally belong to the technical scope of the present invention.

The present invention can be applied to the front door or the rear door of an automobile. Further, the present invention can be applied to not only a door that is disposed at a side portion of an automobile but also a door (also referred to as a tailgate) that is disposed at a rear portion of an automobile. In a case where the present invention is applied to a door that is disposed at a rear portion of an automobile, an inner panel of such a door intersects with the vehicle length direction of the automobile. Therefore, the vehicle length direction described in the above embodiment may be read as a vehicle width direction and the vehicle width direction may be read as a vehicle length direction.

INDUSTRIAL APPLICABILITY

The present invention has high industrial applicability because it is possible to provide an automobile door capable of more reliably absorbing an impact.

BRIEF DESCRIPTION OF THE REFERENCE SYMBOLS

100: exterior panel
122: first impact absorbing member
124: second impact absorbing member
600: door
1000: automobile

The invention claimed is:

1. An automobile door comprising:
an exterior material; and
a first impact absorbing member; and
a second impact absorbing member,
wherein the first impact absorbing member is disposed to traverse the exterior material so as to extend between both end portion regions in a vehicle height direction,
the first impact absorbing member is disposed on a vehicle interior side from the second impact absorbing member,
the second impact absorbing member is disposed to traverse the exterior material so as to extend between both end portion regions in a vehicle length direction,
the second impact absorbing member is disposed adjacent to an inner surface of the exterior material,
the first impact absorbing member and the second impact absorbing member intersect with each other at an intersection portion, and
at a portion excluding both of the end portion regions in the vehicle height direction, both of the end portion regions in the vehicle length direction, and the intersection portion, bending rigidity in a vehicle width direction of the cross section perpendicular to an extending direction of the first impact absorbing member is larger than bending rigidity in the vehicle width direction of a cross section perpendicular to an extending direction of the second impact absorbing member.

2. The automobile door according to claim 1, wherein in the cross section perpendicular to the extending direction of the first impact absorbing member, a width in the vehicle width direction is equal to or larger than a width in the vehicle length direction.

3. The automobile door according to claim 1, wherein in the cross section perpendicular to the extending direction of the second impact absorbing member, a width in the vehicle width direction is equal to or larger than a width in the vehicle height direction.

4. The automobile door according to claim 1, wherein at the intersection portion, a thickness in the vehicle width direction of the first impact absorbing member and/or the second impact absorbing member is reduced.

5. The automobile door according to claim 4, wherein at the intersection portion, the bending rigidity in the vehicle width direction of the cross section perpendicular to the extending direction of the first impact absorbing member is larger than the bending rigidity in the vehicle width direction of the cross section perpendicular to the extending direction of the second impact absorbing member.

6. The automobile door according to claim 1, wherein the first impact absorbing member and/or the second impact absorbing member is joined to the exterior material.

7. The automobile door according to claim 1, wherein the first impact absorbing member and the second impact absorbing member are joined to each other.

8. The automobile door according to claim 1, wherein a plurality of the first impact absorbing members and/or a plurality of the second impact absorbing members are provided.

* * * * *